Patented Apr. 10, 1945

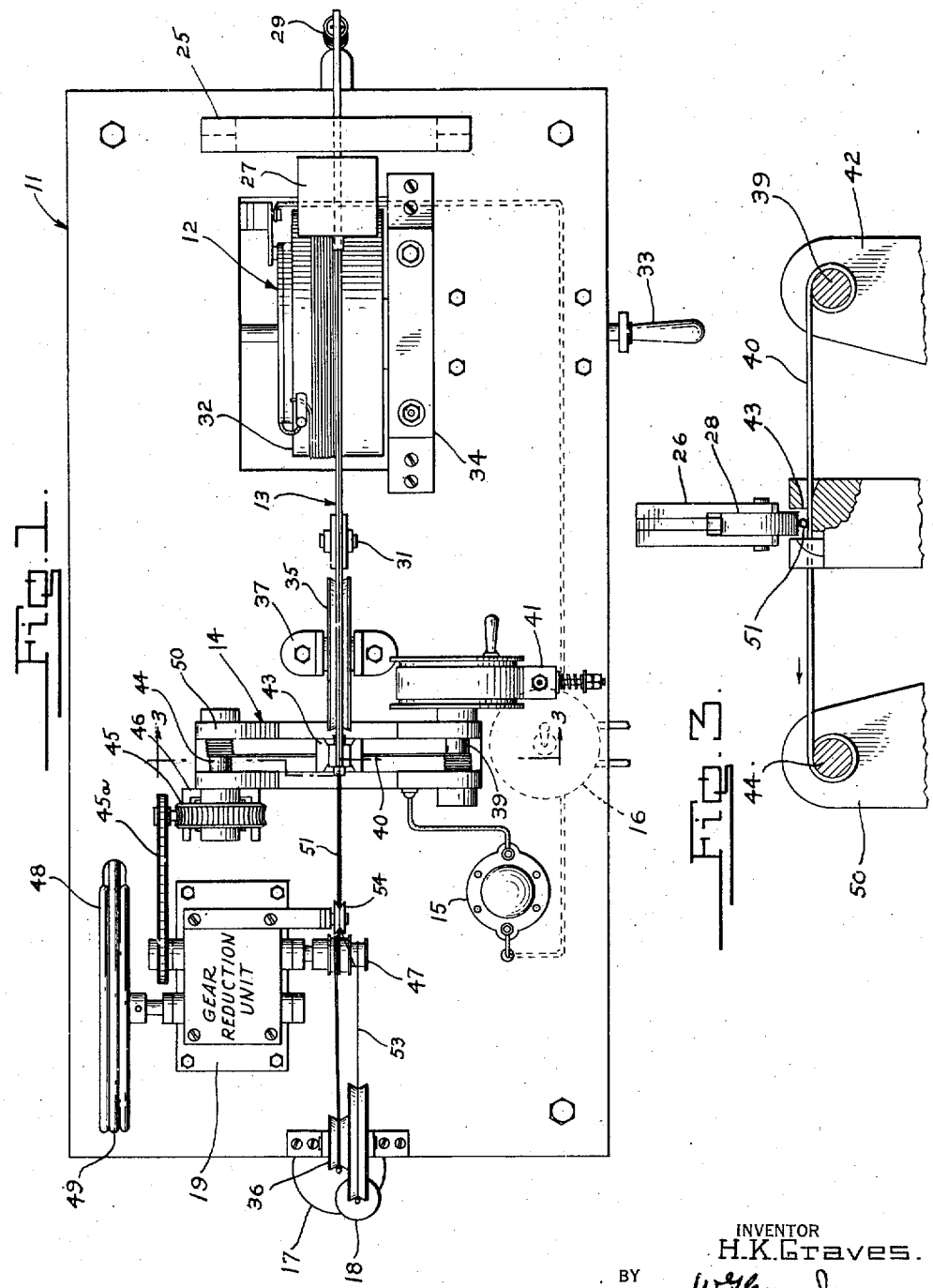

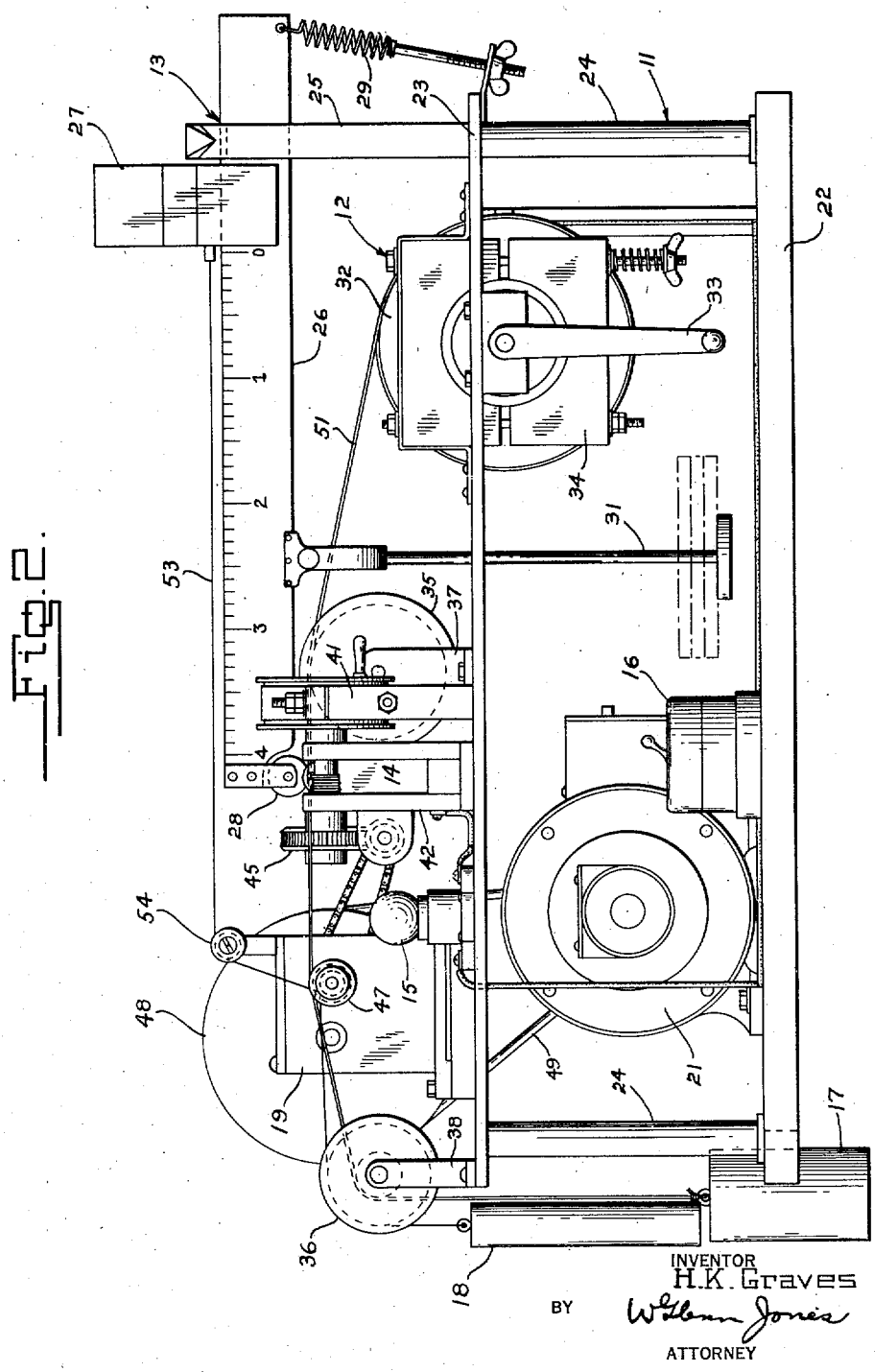

2,373,115

UNITED STATES PATENT OFFICE 2,373,115

ABRASION RESISTANCE TESTING APPARATUS FOR INSULATED WIRE

Harold K. Graves, Tenafly, N. J.

Application February 26, 1944, Serial No. 524,138

10 Claims. (Cl. 73—7)

(Granted under the act of March 3, 1883, as amended April 30, 1928; 370 O. G. 757)

In the handling or processing of insulated wires, various conditions may arise, such as the passage thereof around sharp corners or the like, when the wire is being uncoiled from a storage reel and rewound, for example, on an armature coil. As an exposure of the wire through breakage of the insulation will give rise to short circuiting of the electrical system in which it may ultimately be placed, it is imperative that the insulation possess to a high degree an abrasion resistant quality in order to prevent its failure when subjected to the ordinary fabricating processes.

This invention, therefore, relates to a method and apparatus for testing the abrasion resistance qualities of various types and grades of coatings applied to wire and the like and, in particular, to the insulating coatings applied to magnet wire.

It is an object of this invention to provide a method and apparatus for rapidly and effectively determining the abrasion resistance qualities of magnet wire insulation.

Another object of this invention is to provide an apparatus by which a continually increasing concentrated force may be applied to a freshly presented surface of the wire insulation under investigation until failure thereof occurs.

Still a further object of this invention is to provide a variable speed apparatus for determining the abrasion resistance qualities of the insulation coating of wire.

These and other objects as well as the various other novel features and advantages of this invention will become apparent from a reading of the following specification and accompanying drawings of which:

Fig. 1 is a plan view of the wire insulation abrasion resistance testing apparatus;

Fig. 2 is a side elevation view thereof; and

Fig. 3 is a sectional view taken at 3—3 of Fig. 1.

With reference to Figs. 1, 2 and 3, the testing apparatus consists of a frame 11 having secured thereto a magnet wire supply unit 12, pressure applying unit 13, insulation abrasion resistance testing unit 14, insulation breakdown indicating lamp 15 and double pole switch 16, slack take-up weights 17 and 18, speed reduction unit 19 and variable speed electric motor 21 connected through double pole switch 16, as is the lamp 15, to a suitable source of electrical supply not shown.

Frame 11, to which the various elements are attached, is made up of lower and upper bases 22 and 23 respectively, secured together in spaced relationship by means of stanchions 24 mounted at the corners thereof. The pressure applying unit 13, secured to frame 11, comprises an upright support 25 to which is pivotally mounted a graduated bar 26 on which is secured a slidable weight 27, a pressure roller 28, an adjustable tension spring 29 and an additional load applying support 31. Magnet wire supply unit 12 consists of a drum 32 provided with a hand crank 33 and adjustable brake 34, and guide pulley 35 and stepped pulley 36 supported in suitable pedestals 37 and 38 respectively.

Unit 14 consists of a supply drum 39, with a supply of piano wire 40 of a diameter of 0.015 inches coiled thereon to be utilized as an insulation abrasion element as hereinafter defined, mounted on a pedestal 42 and provided with an adjustable brake 41, a hardened steel apertured guide 43, piano wire take-up drum 44 and supporting pedestal 50, worm gear unit 45 actuated by a chain drive 45a connected to a sprocket on the gear reduction unit 19 and worm gear drive supporting pedestal 46.

Secured to the power output shaft of the speed reduction unit 19 is a stepped pulley 47 and to the power input shaft a pulley 48 driven by motor 21 through belt 49. Lamp 15 provided for indicating a failure of the wire insulation being tested is connected to double pole switch 16 and to a suitable source of electrical supply not shown. One of the terminals of lamp 15 is secured to a slip ring of supply drum 32 and the other terminal to hardened sheel guide 43.

In order to prepare the apparatus for carrying out a test of the abrasion resistance qualities of the insulation of a given sample of magnet wire 51, one end of the wire is connected to drum 32, so that an electrical bond to the slip ring is provided, and a supply of wire wrapped thereon by actuating hand crank 33, and the other end of the wire threaded through the testing apparatus by passing the wire over guide pulley 35, through the hardened steel guide 43 but above and at right angles to abrasion wire 40 which has previously been threaded through the apertured guide 43 and properly tensioned, passed once around driving pulley 47, over guide pulley 36 and secured to a take-up weight 17. Slidable weight 27 is secured to a suitable cord 53 which is passed over guide pulley 54, once around stepped driving pulley 47, over stepped guide pulley 36 and secured to the slack take-up weight 18. Brake 34 is then adjusted to provide the desired tension to be imposed upon the magnet wire 51 when it is drawn through the apparatus. The tensioning force imposed is proportional to the cross-sectional area of the wire so that for a wire of 0.0453 inch in diameter a pull of 6 pounds is preferred.

The insulation abrasion resistance test is carried out in the following manner:

Double pole switch 16 is snapped to the on position, thus energizing electric motor 21 so that it is brought up to the speed desired to cause the magnet wire 51 to travel at approximately 12 feet per minute, the slidable weight 27 at such a speed as to cause the loading at pressure roller 28 to increase at a rate of 3 pounds per minute, and the piano wire 40 to move at a linear speed of approximately ⅓ foot per minute. As the bar 26 is calibrated to indicate the force in pounds applied to the roller 28, the position of slidable weight 27 thereon, as it moves thereover, is carefully checked and its position noted at the instant lamp 15 flashes. Thus the abrasive force necessary to cause a break through of the insulation and resultant closure of the lamp electrical circuit by exposure of the wire 51 is readily ascertained. Should it be desirable to apply a force greater than that ultimately obtainable by the slidable weight 27 alone, an initial loading on pressure roller 28 may be obtained by placing weights on the support 31 before the test is begun.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

I claim:

1. A wire insulation abrasion resistance testing apparatus comprising a wire abrading means, variable speed wire engaging means for drawing a sample of insulated wire across said abrading means, adjustable braking means for opposing movement of said wire thereover, calibrated power driven progressively increasing pressure applying means adapted to press said wire against said abrading means, and means indicating the instant at which failure of the insulation of said wire occurs.

2. A wire insulation abrasion resistance testing apparatus comprising a reel upon which a supply of insulated wire to be tested is coiled, variable speed wire engaging means for uncoiling said wire from said reel, adjustable braking means for opposing the uncoiling of said wire, wire abrading means, means for slidably engaging said wire with said wire abrading means, pressure applying means for power driven progressively increasing the pressure between said wire and said wire abrading means, and means indicating the instant at which failure of the insulation of said wire occurs.

3. A wire insulation abrasion resistance testing apparatus comprising a wire abrading means adapted to present continuously a fresh abrading surface, a speed adjustable wire engaging means for drawing a sample of insulated wire across said abrading surface, adjustable braking means for opposing movement of said wire thereover, calibrated power driven progressively increasing pressure applying means adapted to press said wire against said abrading surface, and means indicating the instant at which failure of the insulation on said wire occurs.

4. A wire insulation abrasion resistance testing apparatus comprising an insulation abrading means adapted to present continuously a fresh abrading surface, speed adjustable wire engaging means for drawing at a predetermined speed a sample of insulated wire across said abrading surface, adjustable braking means for opposing movement of said wire thereover, calibrated power driven progressively increasing pressure applying means adapted to press said wire against said abrading surface, and means indicating the instant at which failure of the insulation of said wire occurs.

5. A wire insulation abrasion resistance testing apparatus comprising a hardened steel insulation abrading wire, a guide through which said abrading wire is passed at a predetermined tension and speed, speed adjustable wire engaging means for drawing at a predetermined speed a sample of insulated wire to be tested through said guide at right angles to and across said insulation abrading wire, adjustable braking means for opposing movement of said wire sample thereover, calibrated progressively increasing pressure applying means adapted to press said wire sample against said insulation abrading wire, and means indicating the instant at which failure of the insulation of said test sample wire occurs.

6. A wire insulation abrasion resistance testing apparatus comprising a base upon which are mounted a reel for storing a supply of insulated wire to be tested, an adjustable brake for said reel, a hardened steel guide, a driven stepped pulley adapted to engage and draw said insulated wire through said guide, a slack take-up weight for said wire, variable speed means for driving said pulley, a reel on which is coiled a length of hardened steel wire, an adjustable brake for said reel, a driving means for drawing the hardened steel wire through said guide in contact with but beneath and at right angles to the insulated wire passing thereover, a pivotally mounted calibrated bar, a balance spring mounted at one end thereof, a pressure roller mounted at the other end of said bar adapted to engage the insulated wire in said guide, a weight slidably movable on said bar for progressively increasing the pressure on said pressure roller, a cord secured to said slidable weight and engaged by said driven stepped pulley, a slack take-up weight for said cord and means for indicating the instant at which failure of the insulation of the test wire occurs.

7. The method of testing the abrasion resistance qualities of an insulation on wire comprising passing the wire at a predetermined speed and tension at right angles to and in contact with an unimpaired constantly moving abrading means, applying pressure between said insulation and said abrading means at a progressively increasing rate, and noting the pressure at which failure of said insulation occurs.

8. The method of testing the abrasion resistance qualities of an insulation on wire comprising passing the wire at a predetermined speed and tension through a guiding means at an angle to and in contact with an unimpaired constantly moving abrading means, applying pressure between said insulation and said abrading means at a progressively increasing rate, and noting the pressure at which failure of said insulation occurs.

9. A wire insulation abrasion resistance testing apparatus comprising a hardened steel insulation abrading wire, a guide through which said abrading wire is passed at a predetermined tension and speed, speed adjustable wire engaging means for drawing at a predetermined speed a sample of insulated wire to be tested through said guide at right angles to and in contact with said insulation abrading wire, adjustable braking means for opposing movement of said wire sample, pressure applying means for progressively increasing the pressure between said insulated wire and said abrading wire, and means indicating the instant at which failure of the insulation of said test sample wire occurs.

10. The method of testing the abrasion resistance qualities of an insulation on wire comprising passing the wire at a predetermined speed and tension at an angle to and in contact with an unimpaired constantly moving abrading means, applying pressure between said insulation and said abrading means at a progressively increasing rate, and noting the pressure at which failure of said insulation occurs.

HAROLD K. GRAVES.

CERTIFICATE OF CORRECTION.

Patent No. 2,373,115.　　　　　　　　　　　　　　April 10, 1945.

HAROLD K. GRAVES.

It is hereby certified that error appears in the printed specification of the above numbered patent requiring correction as follows: Page 2, first column, line 59, claim 2, strike out "power driven" and insert the same before "pressure" in line 58, same claim; and that the said Letters Patent should be read with this correction therein that the same may conform to the record of the case in the Patent Office.

Signed and sealed this 26th day of June, A. D. 1945.

Leslie Frazer (Seal)　　　　　　　　　　　　　Acting Commissioner of Patents.

drawing at a predetermined speed a sample of insulated wire to be tested through said guide at right angles to and in contact with said insulation abrading wire, adjustable braking means for opposing movement of said wire sample, pressure applying means for progressively increasing the pressure between said insulated wire and said abrading wire, and means indicating the instant at which failure of the insulation of said test sample wire occurs.

10. The method of testing the abrasion resistance qualities of an insulation on wire comprising passing the wire at a predetermined speed and tension at an angle to and in contact with an unimpaired constantly moving abrading means, applying pressure between said insulation and said abrading means at a progressively increasing rate, and noting the pressure at which failure of said insulation occurs.

HAROLD K. GRAVES.

CERTIFICATE OF CORRECTION.

Patent No. 2,373,115. April 10, 1945.

HAROLD K. GRAVES.

It is hereby certified that error appears in the printed specification of the above numbered patent requiring correction as follows: Page 2, first column, line 59, claim 2, strike out "power driven" and insert the same before "pressure" in line 58, same claim; and that the said Letters Patent should be read with this correction therein that the same may conform to the record of the case in the Patent Office.

Signed and sealed this 26th day of June, A. D. 1945.

Leslie Frazer (Seal) Acting Commissioner of Patents.